United States Patent
Fletcher

(10) Patent No.: US 10,551,506 B2
(45) Date of Patent: Feb. 4, 2020

(54) ONBOARD DEVICE AND CONTROLLER FOR VEHICLE-TO-VEHICLE DETECTION

(71) Applicant: Cubic Corporation, San Diego, CA (US)

(72) Inventor: Graham Fletcher, Swindon (GB)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 16/223,472

(22) Filed: Dec. 18, 2018

(65) Prior Publication Data

US 2019/0187293 A1    Jun. 20, 2019

Related U.S. Application Data

(60) Provisional application No. 62/608,211, filed on Dec. 20, 2017.

(51) Int. Cl.
 *G01S 19/14* (2010.01)
 *G01S 19/37* (2010.01)
 (Continued)

(52) U.S. Cl.
 CPC ............. *G01S 19/14* (2013.01); *G01S 19/37* (2013.01); *G07B 15/063* (2013.01); *G08G 1/0175* (2013.01)

(58) Field of Classification Search
 CPC .................................. G01S 19/14; G01S 19/37
 (Continued)

(56) References Cited

U.S. PATENT DOCUMENTS

| 5,717,389 A | * | 2/1998 | Mertens | G07B 15/063 |
| | | | | 340/928 |
| 8,471,763 B2 | * | 6/2013 | Daems | G01S 19/03 |
| | | | | 342/357.59 |

(Continued)

FOREIGN PATENT DOCUMENTS

| EP | 2690601 A2 | 1/2014 |
| WO | 2017/198710 A1 | 11/2017 |

OTHER PUBLICATIONS

International Search Report and Written Opinion dated May 7, 2019 in related PCT application No. PCT/US2018/065765, 100 pgs.

(Continued)

*Primary Examiner* — Frank J McGue

(74) *Attorney, Agent, or Firm* — Kilpatrick Townsend & Stockton

(57) ABSTRACT

An onboard electronic device for mounting to a first vehicle. The onboard device may include a capture device configured to capture identifying data associated with a second vehicle. The onboard device may also include a GNSS receiver configured to detect position data based on at least one GNSS signal. The onboard device may further include an onboard controller communicatively coupled to the capture device and the GNSS receiver. The onboard controller may be configured to perform operations including receiving the identifying data from the capture device, receiving the position data from the GNSS receiver, and generating a data report signal based on the identifying data and the position data. The onboard device may further comprise a transmitting antenna configured to transmit the data report signal.

20 Claims, 14 Drawing Sheets

(51) Int. Cl.
*G07B 15/06* (2011.01)
*G08G 1/017* (2006.01)

(58) Field of Classification Search
USPC .................................................... 342/357.52
See application file for complete search history.

(56) References Cited

U.S. PATENT DOCUMENTS

| | | | |
|---|---|---|---|
| 9,079,587 B1* | 7/2015 | Rupp | G05D 1/0289 |
| 2010/0085251 A1* | 4/2010 | Katayama | G01S 19/33 |
| | | | 342/357.52 |
| 2011/0087525 A1* | 4/2011 | Boss | G06Q 30/02 |
| | | | 705/14.1 |

OTHER PUBLICATIONS

Yang, et al., "Sharpen the Correlation Peak, A Novel GNSS Receiver Architecture with Variable IF Correlation", Navigation: Journal of the Institute of Navigation, Institute of Navigation, Fairfax, VA, US, vol. 63, No. 3, Sep. 1, 2016 (Sep. 1, 2016), pp. 249-265, XP056013641, ISSN: 0028-1522, fig. 1.

* cited by examiner

ONBOARD DEVICE AND CONTROLLER FOR VEHICLE-TO-VEHICLE DETECTION

CROSS-REFERENCES TO RELATED APPLICATIONS

This Application claims priority to U.S. Provisional Patent Application No. 62/608,211 filed Dec. 20, 2017, the entire disclosure of which is hereby incorporated by reference, for all purposes, as if fully set forth herein.

BACKGROUND OF THE INVENTION

Governments, agencies, and/or other authorities typically impose taxes on fuel use, such as gasoline, to cover the construction and maintenance of roads. Although this may have been sufficient in the past, the increasing popularity of electric vehicles may make this method of payment obsolete. More specifically, as charging electric vehicles at home or elsewhere gains popularity, taxes on fuel may become insufficient to pay for road use, and taxes on electricity may be considered unfair for those who use electricity but do not have electric vehicles. Determining actual road use and imposing taxes and/or tolls accordingly may be a more equitable solution. To determine actual road use, tolling techniques may be considered.

While traditional techniques of tolling may be sufficient for determining road use on a single highway, they may be impractical for determining all road use of a vehicle. Current tolling for road use is typically done utilizing roadside infrastructure, such as cameras and/or other sensors/detectors equipped to identify passing vehicles driving along a road. But equipping all roads with such roadside infrastructure would be enormously expensive, thereby making this approach impractical in most circumstances.

An alternative approach is to use "self-reporting" techniques in which a device located in the vehicle reports the usage of the vehicle to a tolling authority (e.g., government agency, etc.). However, because self-reporting solutions involve devices located in the vehicle that impact the amount of money owed by the driver of the vehicle, these self-reporting solutions are wrought with fraud. The driver of the vehicle may tamper with a device by, for example, covering the device's GPS antenna in tin/aluminum foil so that it is unable to determine the location of the vehicle, preventing the device from providing reliable information to a tolling authority. Accordingly, new systems, methods, devices, and other techniques are needed.

BRIEF SUMMARY OF THE INVENTION

A summary of the invention is described in reference to one or more examples listed below. As used below, any reference to a series of examples is to be understood as a reference to each of those examples disjunctively (e.g., "Examples 1-4" is to be understood as "Examples 1, 2, 3, or 4").

Example 1 is an onboard device for mounting to a first vehicle, the onboard device comprising: a capture device configured to capture identifying data associated with a second vehicle; a Global Navigation Satellite System (GNSS) receiver configured to detect position data based on at least one GNSS signal, the GNSS receiver comprising: a receiving antenna for receiving the at least one GNSS signal from one or more GNSS satellites; a radio frequency (RF) front end coupled to the receiving antenna comprising: a local oscillator configured to generate a sinusoidal signal; a mixer configured to mix the sinusoidal signal with the at least one GNSS signal to generate at least one mixed signal; an analog-to-digital (A/D) converter configured to sample the at least one mixed signal to generate digital samples; and a receiver processor configured to generate the position data by processing the digital samples; an onboard controller communicatively coupled to the capture device and the GNSS receiver, wherein the onboard controller is configured to perform operations including: receiving the identifying data from the capture device; receiving the position data from the GNSS receiver; and generating a data report signal based on the identifying data and the position data; and a transmitting antenna configured to transmit the data report signal.

Example 2 is the onboard device of example(s) 1, wherein the capture device comprises a camera and the identifying data comprises an image of the second vehicle.

Example 3 is the onboard device of example(s) 1-2, wherein the data report signal includes: a vehicle identifier generated based on the identifying data; and a position generated based on the position data.

Example 4 is the onboard device of example(s) 1-3, wherein the data report signal further includes a time stamp associated with the position and the vehicle identifier.

Example 5 is the onboard device of example(s) 1-4, wherein the capture device and the GNSS receiver are communicatively coupled to the onboard controller via wired connections.

Example 6 is the onboard device of example(s) 1-5, wherein the capture device is communicatively coupled to the onboard controller via a wireless connection.

Example 7 is the onboard device of example(s) 1-6, wherein the GNSS receiver is communicatively coupled to the onboard controller via a wireless connection.

Example 8 is a method comprising: capturing, using a capture device mounted to a first vehicle, identifying data associated with a second vehicle; detecting, using a Global Navigation Satellite System (GNSS) receiver mounted to the first vehicle, position data based on at least one GNSS signal, wherein detecting the position data includes: receiving, by the GNSS receiver via a receiving antenna, the at least one GNSS signal from one or more GNSS satellites; generating, by a local oscillator of a radio frequency (RF) front end of the GNSS receiver, a sinusoidal signal; mixing, by a mixer of the RF front end, the sinusoidal signal with the at least one GNSS signal to generate at least one mixed signal; sampling, by an analog-to-digital (A/D) converter of the RF front end, the at least one mixed signal to generate digital samples; and generating, by a receiver processor of the GNSS receiver, the position data by processing the digital samples; receiving, by an onboard controller mounted to the first vehicle, the identifying data from the capture device; receiving, by the onboard controller, the position data from the GNSS receiver; generating, by the onboard controller, a data report signal based on the identifying data and the position data; and transmitting, via a transmitting antenna mounted to the first vehicle, the data report signal.

Example 9 is the method of example(s) 8, wherein the capture device comprises a camera and the identifying data comprises an image of the second vehicle.

Example 10 is the method of example(s) 8-9, wherein the data report signal includes: a vehicle identifier generated based on the identifying data; and a position generated based on the position data.

Example 11 is the method of example(s) 8-10, wherein the data report signal further includes a time stamp associated with the position and the vehicle identifier.

Example 12 is the method of example(s) 8-11, wherein the capture device and the GNSS receiver are communicatively coupled to the onboard controller via wired connections.

Example 13 is the method of example(s) 8-12, wherein the capture device is communicatively coupled to the onboard controller via a wireless connection.

Example 14 is the method of example(s) 8-13, wherein the GNSS receiver is communicatively coupled to the onboard controller via a wireless connection.

Example 15 is a vehicle comprising: a capture device configured to capture identifying data associated with a second vehicle; a Global Navigation Satellite System (GNSS) receiver configured to detect position data based on at least one GNSS signal, the GNSS receiver comprising: a receiving antenna for receiving the at least one GNSS signal from one or more GNSS satellites; a radio frequency (RF) front end coupled to the receiving antenna comprising: a local oscillator configured to generate a sinusoidal signal; a mixer configured to mix the sinusoidal signal with the at least one GNSS signal to generate at least one mixed signal; an analog-to-digital (A/D) converter configured to sample the at least one mixed signal to generate digital samples; and a receiver processor configured to generate the position data by processing the digital samples; an onboard controller communicatively coupled to the capture device and the GNSS receiver, wherein the onboard controller is configured to perform operations including: receiving the identifying data from the capture device; receiving the position data from the GNSS receiver; and generating a data report signal based on the identifying data and the position data; and a transmitting antenna configured to transmit the data report signal.

Example 16 is the vehicle of example(s) 15, wherein the capture device comprises a camera and the identifying data comprises an image of the second vehicle.

Example 17 is the vehicle of example(s) 15-16, wherein the data report signal includes: a vehicle identifier generated based on the identifying data; and a position generated based on the position data.

Example 18 is the vehicle of example(s) 15-17, wherein the data report signal further includes a time stamp associated with the position and the vehicle identifier.

Example 19 is the vehicle of example(s) 15-18, wherein the capture device and the GNSS receiver are communicatively coupled to the onboard controller via wired connections.

Example 20 is the vehicle of example(s) 15-19, wherein the capture device is communicatively coupled to the onboard controller via a wireless connection.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

Figure 1:
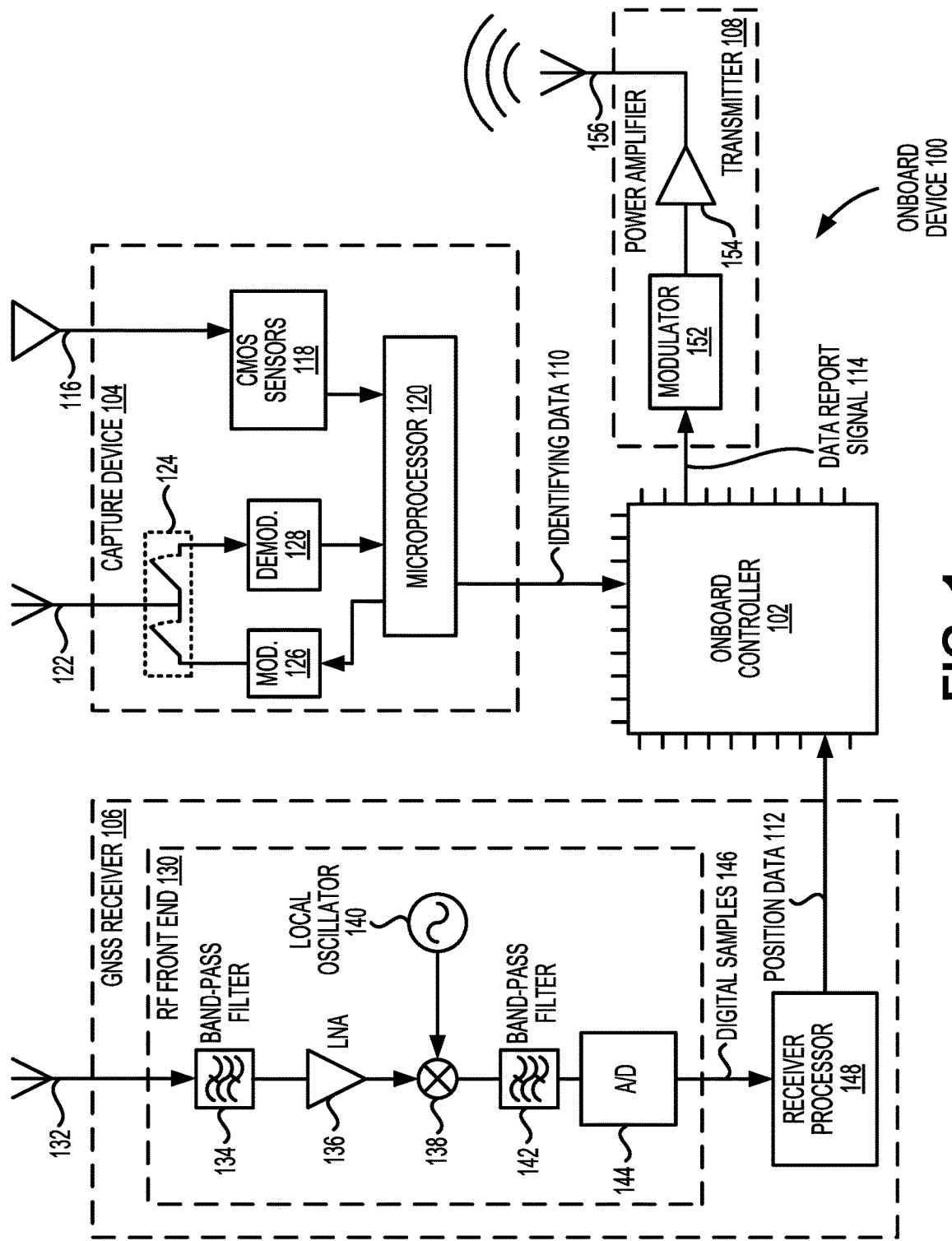
FIG. 1 illustrates a block diagram of an onboard device, according to some embodiments of the present invention.

In the appended figures, similar components and/or features may have the same numerical reference label. Further, various components of the same type may be distinguished by following the reference label by a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION OF THE INVENTION

Embodiments of the present invention provide a highly sophisticated electronic device that may be mounted to a vehicle to perform vehicle-to-vehicle detection. The device may include a Global Navigation Satellite System (GNSS) receiver having one or more band-pass filters, a low-noise amplifier, a local oscillator, a mixer, an analog-to-digital (A/D) converter, and a receiver processor for detecting position data corresponding to the vehicle to which the device is mounted and/or to a second vehicle near the first vehicle. The device may also include a capture device comprising an array of image sensors for capturing identifying data associated with the second vehicle. An onboard controller may receive data from the GNSS receiver and the capture device and may generate a data report signal to be transmitted using a transmitting antenna.

Techniques provided herein allow for vehicle-to-vehicle detection in which onboard electronic devices located in vehicles are utilized to report information about surrounding vehicles. In some embodiments, a rear-facing camera of an onboard device mounted to a first vehicle can be utilized to capture an image of a number/license plate of a second vehicle. An onboard controller in the first vehicle can process the image to identify that a number/license plate has been captured in the image, then send the image to a server (e.g., via the Internet and/or another data network), along with a timestamp and a location associated with the image. The server maintained by, for example, a the tolling authority can then calculate a route taken by the second vehicle, and determine an appropriate toll for the route taken.

Depending on desired functionality, image capture may be conducted using any one of a variety of ways. In some embodiments, a rear-facing camera may be configured to capture video, in which case frames of the video would be analyzed for the presence of a license plate or other unique identifier. In some embodiments, the rear-facing camera may be configured to capture images at a slower rate (e.g., one image every second, every three seconds, every five seconds, or the like). In some embodiments, image capture may be trigger-based where, for example, the output of another sensor (e.g., a proximity sensor that determines a car or other object is within a certain distance to the first car) may trigger the capture of an image. A time and location at which each image is captured may be determined in parallel (e.g., by a clock and GPS, respectively, of the first vehicle). If an image is determined to have a license plate (or other identifier) of the second car, the image, and the corresponding timestamp and location, may then be sent to a server to compute tolling and/or other information.

The vehicles having onboard electronic devices may comprise only a fraction of the vehicles on a road. Nonetheless, this can still result in highly accurate tolling. In some instances, for example, although the vehicles communicatively connected to the tolling server comprise perhaps only 10% of vehicles on a particular road, they may be able to capture images of virtually all vehicles on the road. As such, the tolling authority (e.g., government) may contract with a particular subset of all vehicles to provide the tolling information used in the embodiments described herein. These vehicles may comprise fleets of commercial vehicles (e.g., delivery trucks, semi-trucks, taxis, etc.) transit vehicles (e.g., buses), and the like. The tolling authority may further provide incentives to the vehicles that participate (e.g., in the form of tolling credits, money, etc.).

FIG. 1 illustrates a block diagram of an onboard device 100, according to some embodiments of the present invention. Onboard device 100 may be mounted to a vehicle to capture and report information regarding surrounding vehicles. As used herein, onboard device 100 (or a component therein) may be considered to be mounted to a vehicle when one or more components of onboard device 100 are attached to, fixed to, fastened to, integrated with, contained within, or secured to one or more components of a vehicle. Onboard device 100 may be mounted to a vehicle during the manufacture thereof or in an aftermarket configuration. Onboard device 100 may comprise various components including an onboard controller 102, a capture device 104, a Global Navigation Satellite System (GNSS) receiver 106, and a transmitter 108. Each of capture device 104, GNSS receiver 106 and transmitter 108 may be communicatively coupled to onboard controller 102 through one or more wired and/or wireless connections, which may enable unidirectional or bidirectional communications.

For example, although FIG. 1 shows unidirectional communication between capture device 104 and onboard controller 102, in some embodiments onboard controller 102 may send data to capture device 104, such as information from other vehicle systems regarding a relative proximity or direction of a second vehicle, or a timing signal allowing capture device 104 to generate data concurrently or simultaneously with GNSS receiver 106. Similarly, although FIG. 1 shows unidirectional communication between GNSS receiver 106 and onboard controller 102, in some embodiments onboard controller 102 may send data to GNSS receiver 106, such as information from other vehicle systems and/or the above-mentioned timing signal.

Capture device 104 may be configured to capture identifying data 110 associated with a second vehicle that is separate from the vehicle to which onboard device 100 is mounted. In some embodiments, capture device 104 comprises a camera 116 configured to capture an image of a second vehicle. In such embodiments, identifying data 110 may include the image of the second vehicle, data extracted from the image of the second vehicle such as a vehicle identifier (e.g., license plate number), an alternative representation of the image of the second vehicle (e.g., features determined by a feature extractor), and the like. Camera 116 may include or may be coupled to a plurality of complementary metal-oxide-semiconductor (CMOS) sensors 118 for detecting and converting light waves into signals. Each of the plurality of CMOS sensors 118 may correspond to a pixel of the captured image. Images captured by camera 116 may be sent to a microprocessor 120 for further processing or may be directly sent to onboard controller 102 as identifying data 110.

In some embodiments, capture device 104 comprises a wireless interface for transmitting and receiving electromagnetic signals to and from a second vehicle. For example, the wireless interface may include a transceiver antenna 122 coupled to a switching circuit 124 configured to alternate between a transmitting mode and a receiving mode. While operating in the transmitting mode, signals generated by microprocessor 120 are modulated by a modulator 126 and are transmitted using transceiver antenna 122. While operating in the receiving mode, signals generated and transmitted by the second vehicle are received by transceiver antenna 122 and are demodulated by demodulator 128. Microprocessor 120 may then generate identifying data 110 based on the received signals. In such embodiments, identifying data 110 may include the received signal, data extracted from the received signal such as a vehicle identifier (e.g., license plate number) associated with the second vehicle, and the like.

GNSS receiver 106 may include a receiving antenna 132 for receiving GNSS signals from GNSS satellites and sending/routing the GNSS signals to a radio frequency (RF) front end 130. Receiving antenna 132 may be linearly or circularly polarized, may be mounted or embedded, may be a single antenna or an array antenna, may have a narrow or wide bandwidth, among other possibilities. RF front end 130 may include a band-pass filter 134 for initially filtering out undesirable frequency components outside the frequencies of interest, a low-noise amplifier (LNA) 136 for amplifying the received signal, a local oscillator 140 and a mixer 138 for down converting the received signal from RF to intermediate frequencies (IF), a band-pass filter 142 for removing frequency components outside IF, and an A/D converter 144 for sampling the received signal (i.e., mixed signal) to generate digital samples 146. Local oscillator 140 may generate a sinusoidal signal having a particular frequency such that mixing the sinusoidal signal with the received signal causes the mixed signal to be down converted to IF.

In some instances, RF front end 130 includes additional or fewer components than that shown in FIG. 1. For example, RF front end 130 may include a second local oscillator (90 degrees out of phase with respect to local oscillator 140), a second mixer, a second band-pass filter, and a second A/D converter for generating digital samples corresponding to the quadrature component of the GNSS signals. Digital samples corresponding to the in-phase component of the GNSS signals and digital samples corresponding to the quadrature component of the GNSS signals may both be sent to receiver processor 148. In some embodiments, digital samples corresponding to both in-phase and quadrature components may be included in digital samples 146. In some embodiments, receiver processor 148 may include one or more correlators.

Other components within RF front end 130 may include a phase-locked loop (PLL) for synchronizing the phase of local oscillator 140 with the phase of the received signal, and a phase shifter for generating a second mixing signal using local oscillator 140 that is 90 degrees out of phase with local oscillator 140. In some embodiments, front end 130 does not include band-pass filter 134 and LNA 136. In some embodiments, A/D converter 144 is coupled directly to antenna 132 and samples the RF signal directly without down-conversion to IF. In some embodiments, front end 130 only includes band-pass filter 134 and A/D converter 144. Other possible configurations of front end 130 are contemplated.

Receiver processor 148 may perform one or more correlations on digital samples 146 using local codes to generate distance estimates between GNSS receiver 106 and the GNSS satellites. In some embodiments, one or more components of receiver processor 148 (such as, for example, one or more correlators) include specific pieces of hardware, such as an application-specific integrated circuit (ASIC) or a field-programmable gate array (FPGA). In some embodiments, operations performed by receiver processor 148 are performed entirely in software using digital signal processing (DSP) techniques. After generating the distance estimates, receiver processor 148 may perform trilateration to generate a position estimate for GNSS receiver 106. After generating at least one position estimate, receiver processor 148 may output position data 112 comprising a single or a plurality of GNSS points (i.e., position estimates). Each of the plurality of GNSS points may be a 3D coordinate represented by three numbers. In some embodiments, the three numbers may correspond to latitude, longitude, and elevation/altitude. In other embodiments, the three numbers may correspond to X, Y, and Z positions. Position data 112 may be sent to onboard controller 102, outputted to be displayed to a user, transmitted to a separate device (e.g., computer, smartphone, server, etc.) via a wired or wireless connection, or further processed, among other possibilities.

Onboard controller 102 may include one or more processors and an associated memory. The associated memory may include instructions that cause the processors to perform operations such as receiving position data 112 from GNSS receiver 106, receiving identifying data 110 from capture device 104, and generating a data report signal 114 based on position data 112 and identifying data 110. Data report signal 114 may include a vehicle identifier generated based on identifying data 110. The vehicle identifier may correspond to a second vehicle and may include, e.g., a license plate number. Data report signal 114 may also include a position generated based on position data 112. The position may correspond to the geospatial location of the first vehicle and, due to the close proximity between the first vehicle and the second vehicle, may also be used to correspond to the geospatial location of the second vehicle.

Transmitter 108 may include a modulator 152 for modulating data report signal 114 and a power amplifier 154 for increasing the power of data report signal 114. Transmitter 108 may include a transmitting antenna 156 for wirelessly transmitting data report signal 114. In some embodiments, power amplifier 154 may be adjusted such that the power of data report signal 114 may be increased or decreased based on the distance between transmitting antenna 156 and the receiving antenna configured to receive data report signal 114. For example, at larger distances between transmitting antenna 156 and the receiving antenna, the power of the transmitted data report signal 114 may be increased.

Figure 2:
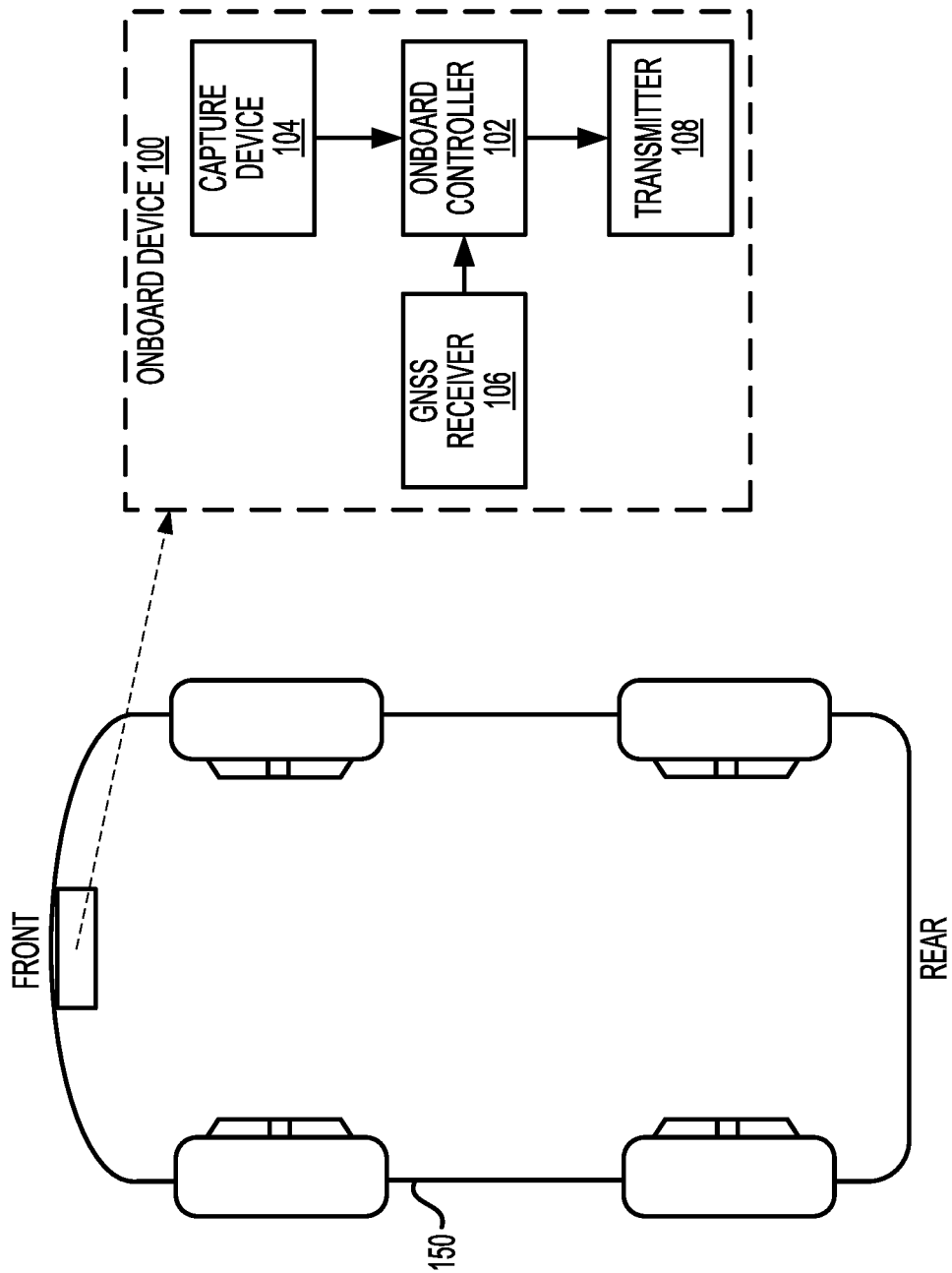
FIG. 2 illustrates a possible mounting position of onboard device to a vehicle, according to some embodiments of the present invention.

FIG. 2 illustrates a possible mounting position of onboard device 100 to a vehicle 150 (i.e., the first vehicle), according to some embodiments of the present invention. In the illustrated embodiment, onboard device 100 is mounted as a single component to the front of vehicle 150. Camera 116 may be pointed in the forward direction so as to capture an image of the rear license plate of a second vehicle driving in front of vehicle 150.

Figure 3:
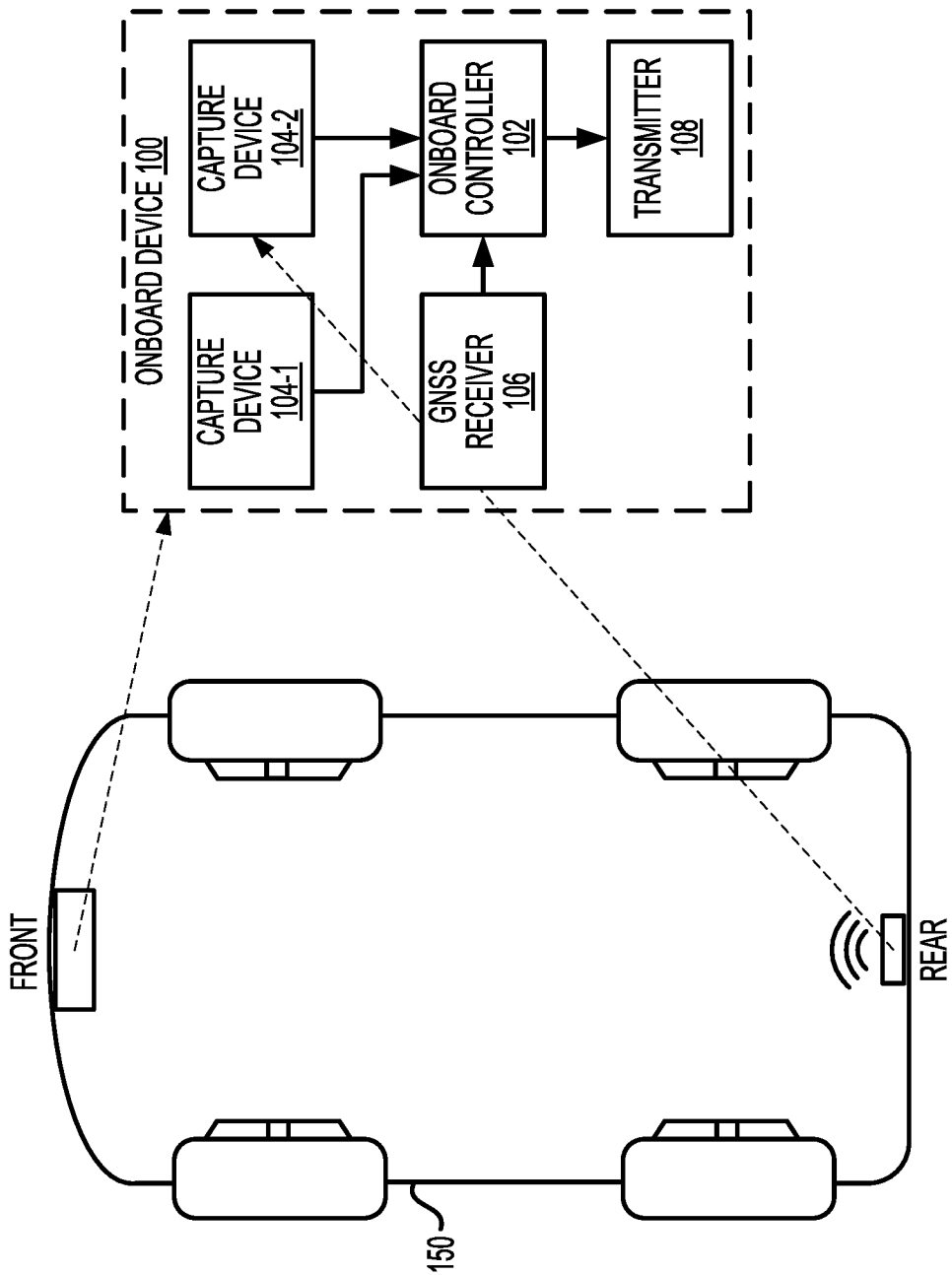
FIG. 3 illustrates possible mounting positions of an onboard device to a vehicle, according to some embodiments of the present invention.

FIG. 3 illustrates possible mounting positions of onboard device 100 to vehicle 150, according to some embodiments of the present invention. In the illustrated embodiment, onboard device 100 is mounted as two separate components, a first component comprising onboard controller 102, a first capture device 104-1, GNSS receiver 106, and transmitter 108, and a second component comprising a second capture device 104-2. The first component may be mounted to the front of vehicle 150 allowing camera 116 of first capture device 104-1 to be pointed in the forward direction so as to capture an image of the rear license plate of a second vehicle driving in front of vehicle 150. The second component may be mounted to the rear of vehicle 150 allowing camera 116 of second capture device 104-2 to be pointed in the rear direction so as to capture an image of the front license plate of a second vehicle driving behind vehicle 150. First capture device 104-1 may communicate with onboard controller 102 via a wired connection and second capture device 104-2 may communicate with onboard controller 102 via a wireless connection.

Figure 4:
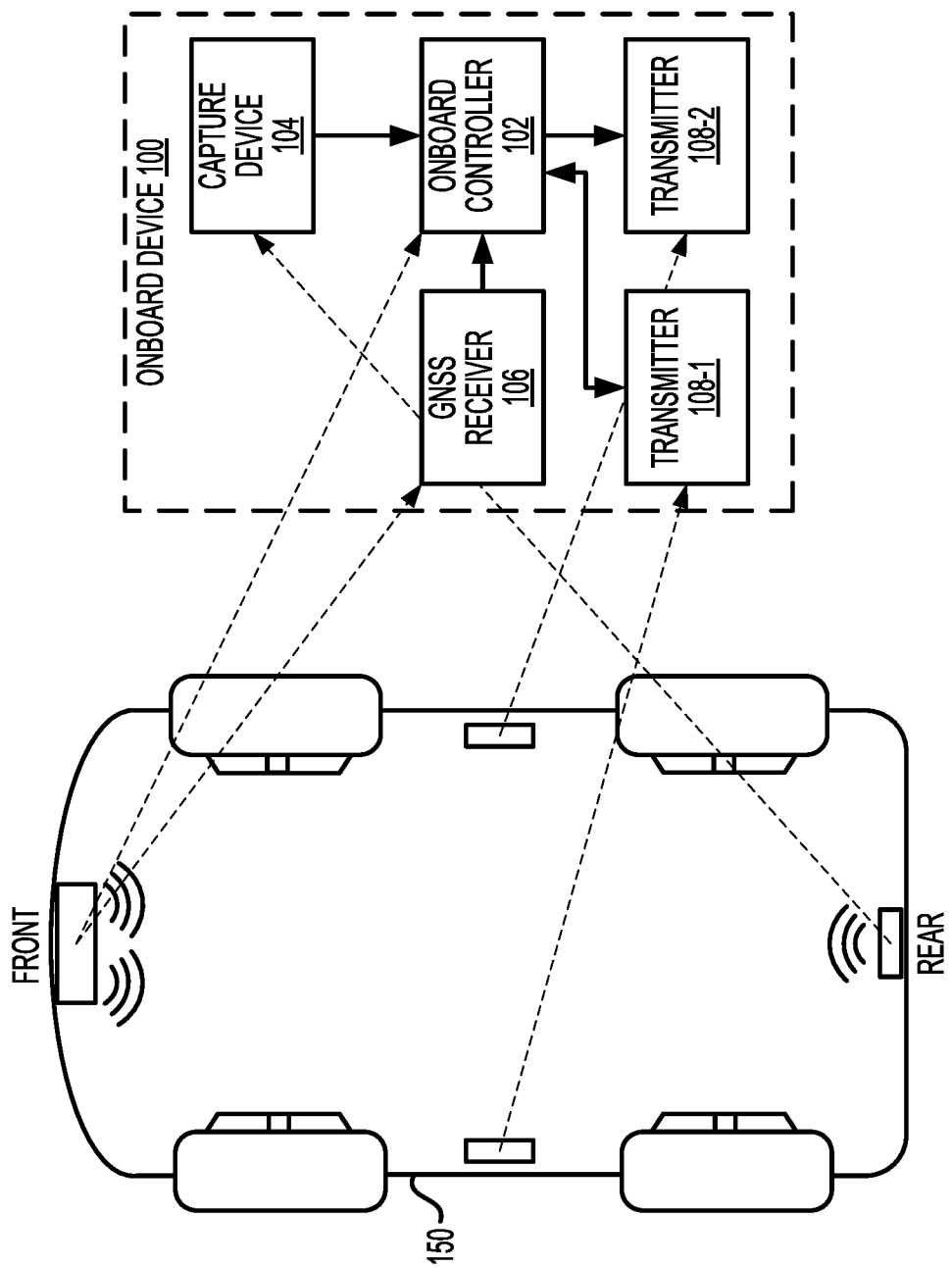
FIG. 4 illustrates possible mounting positions of an onboard device to vehicle, according to some embodiments of the present invention.

FIG. 4 illustrates possible mounting positions of onboard device 100 to vehicle 150, according to some embodiments of the present invention. In the illustrated embodiment, onboard device 100 is mounted as four separate components, a first component comprising onboard controller 102 and GNSS receiver 106, a second component comprising capture device 104, a third component comprising a first transmitter 108-1, and a fourth component comprising a second transmitter 108-2. The first component may be mounted to the front of vehicle 150. The second component may be mounted to the rear of vehicle 150 allowing camera 116 to be pointed in the rear direction so as to capture an image of the front license plate of a second vehicle driving behind vehicle 150. The third component may be mounted to the left side of vehicle 150 and the fourth component may be mounted to the right side of vehicle 150. In such embodiments, data report signal 114 may be transmitted via transmitting antenna 156 of transmitters 108 at both sides of vehicle 150 thereby increasing the likelihood of successful transmission to a receiving system.

Figure 5:
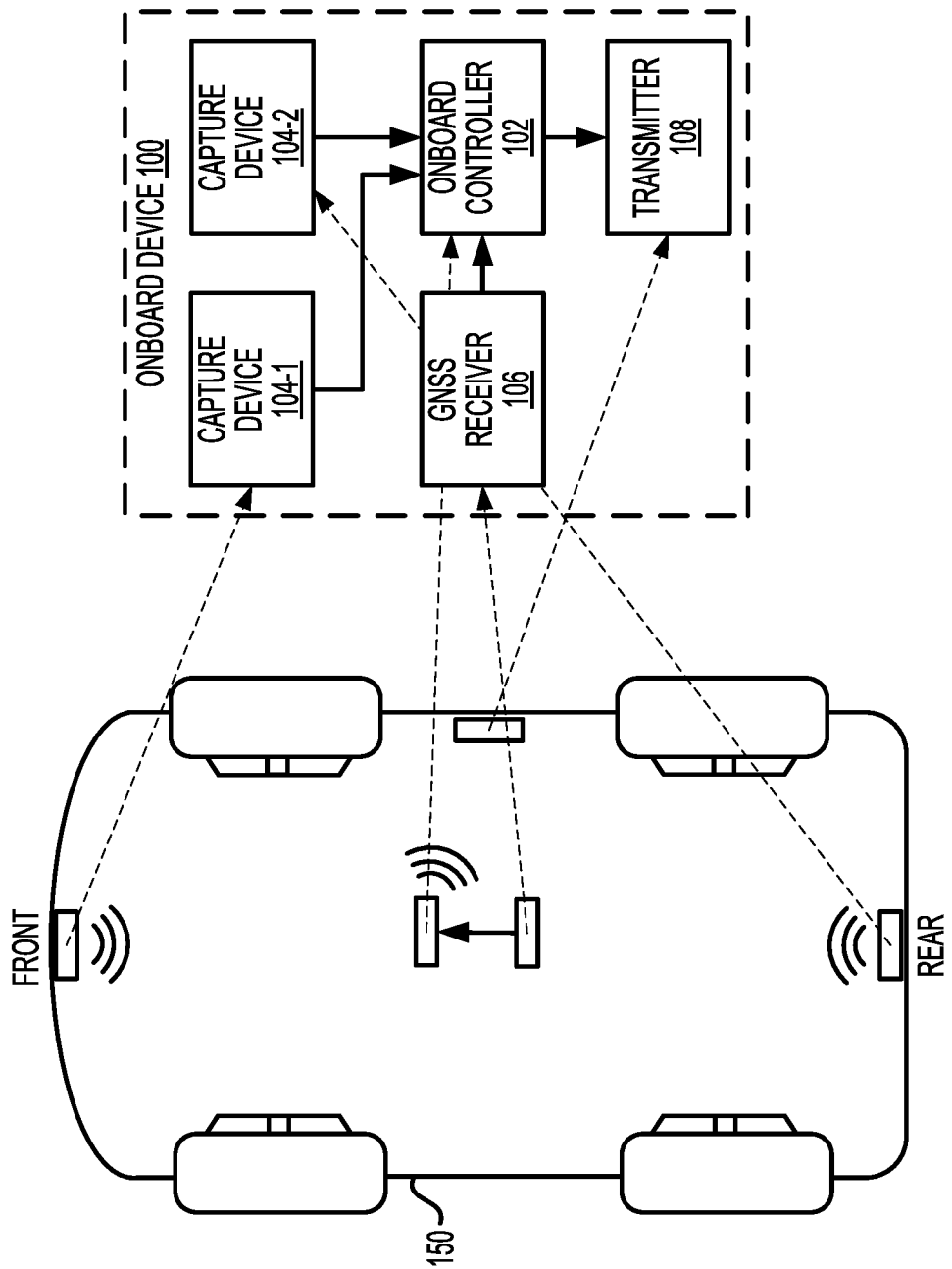
FIG. 5 illustrates possible mounting positions of an onboard device to a vehicle, according to some embodiments of the present invention.

FIG. 5 illustrates possible mounting positions of onboard device 100 to vehicle 150, according to some embodiments of the present invention. In the illustrated embodiment, onboard device 100 is mounted as five separate components, a first component comprising onboard controller 102, a second component comprising GNSS receiver 106, a third component comprising first capture device 104-1, a fourth component comprising second capture device 104-2, and a fifth component comprising transmitter 108. The first component may be mounted to the middle of vehicle 150. The second component may be mounted to the front of vehicle 150 allowing camera 116 of first capture device 104-1 to be pointed in the forward direction so as to capture an image of the rear license plate of a second vehicle driving in front of vehicle 150. The third component may be mounted to the rear of vehicle 150 allowing camera 116 of second capture device 104-2 to be pointed in the rear direction so as to capture an image of the front license plate of a second vehicle driving behind vehicle 150. The fourth component may be mounted to the middle of vehicle 150. The fifth component may be mounted to the right side of vehicle 150. First capture device 104-1 and second capture device 104-2 may communicate with onboard controller 102 via wireless connections, GNSS receiver 106 may communicate with onboard controller 102 via a wired connection, and onboard controller 102 may communicate with transmitter 108 via a wireless connection.

Figure 6:
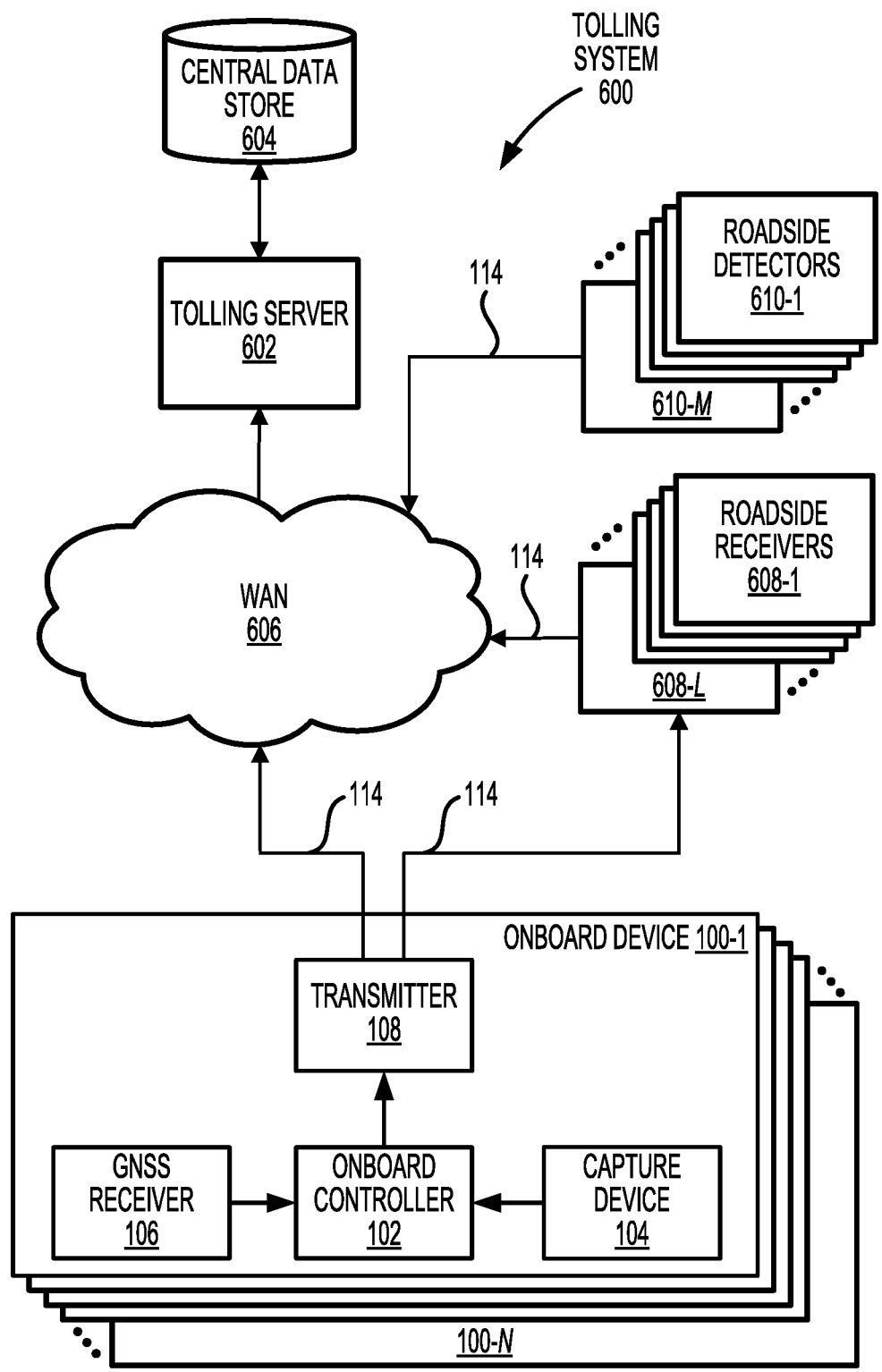
FIG. 6 illustrates a block diagram of a tolling system, according to some embodiments of the present invention.

FIG. 6 illustrates a block diagram of a tolling system 600, according to some embodiments of the present invention. Tolling system 600 can be implemented in various forms of transportation including cars, buses, trains, boats, etc. Tolling system 600 may include a plurality of onboard devices 100 mounted to various transportation vehicles. Accordingly, each of onboard devices 100 may be mounted to a car, a bus, a train, a boat, and the like. Tolling system 600 may be implemented within a particular transportation network (e.g., a roadway network), and each vehicle operating within the transportation network may be given the option to mount one of onboard devices 100 to their vehicle. In some embodiments, participating vehicles may be given a discount from tolls for having installed one of onboard devices 100. In some embodiments, all vehicles may be forced to mount one of onboard devices 100 to operate within the transportation network. For example, installation of onboard devices 100 may be a requirement of the vehicle registration process for vehicles operating within a particular transportation network.

In some embodiments, tolling system 600 may include a tolling server 602 for receiving data report signals 114. Tolling server 602 may calculate tolls based on the received data report signals 114 and charge the calculated tolls to the vehicles to which data report signals 114 correspond. Data used by tolling server 602 in connection with operation of tolling system 600 may be stored in a central data store 604 communicatively coupled to tolling server 602. For example, data report signals 114 or information contained in data report signals 114 (e.g., vehicle identifier, vehicle position, time stamp, etc.) may be stored in central data store 604. In some embodiments, tolling server 602 may receive data report signals 114 via a wide area network (WAN) 140. For example, onboard devices 100, may send data report signals 114 to tolling server 602 via WAN 140. In some embodiments, WAN 140 comprises a cellular network.

In some embodiments, tolling server 602 includes a prediction engine for determining one or more predicted paths for a particular vehicle based on one or more data report signals 114 corresponding to the particular vehicle. For example, tolling server 602 may determine that a vehicle was operating at a first point along a first road at a first time and at a second point along a second road at a second time. Tolling server 602 may determine the predicted path(s) of the vehicle based on speed limits, driving distances, current traffic conditions, weather conditions, road closures, the direction of travel, and the like. Once the predicted path(s) have been determined, a toll may be calculated for each predicted path and a minimum toll (or, in some embodiments, a maximum toll) may be charged to the vehicle.

In some embodiments, users of the transportation network may create and maintain a user account with tolling system 600. The user account can comprise information regarding the user, such as a name, address, phone number, email address, user identification (such as a unique identifier of the user or other user ID), passcode (such as a password and/or personal identification number (PIN)), a vehicle identifier corresponding the user's vehicle, information regarding user preferences and user opt-in or opt-out selections for various services, product(s) associated with the user account, a value and/or credit associated with the product(s), information regarding a funding source for the user account, among other possibilities. A user may request a user account and provide the information listed above by phone (such as a call to a customer service center maintained and/or provided by tolling system 600), on the Internet, or by other means. Tolling server 602 can use the information provided by the user to create the user account, which can be stored and/or maintained on a database, such as central data store 604.

In some embodiments, a funding source can be linked to a user account to provide funding to pay for tolls. The funding source can be external to tolling system 600 and can be maintained by a financial institution. Such a funding source may include a savings or checking account, a prepaid account, a credit account, an e-commerce account (such as a PAYPAL® account), or more, which can transfer funds via automated clearing house (ACH) or other means. If a user account comprises information regarding a funding source, tolling server 602 can use the information to pay for tolls or fund purchases or other transactions of a user. These transactions can be made on the Internet, by phone, text, email, or a variety of other different ways, and transaction information can then be sent to tolling server 602 to update the user account associated with the transactions and reconcile payments and purchases with the funding source. Tolling server 602 can communicate with the financial institution (or other entity maintaining the funding source) through a financial network.

In some embodiments, tolling system 600 may include one or more roadside receivers 608 permanently or semi-permanently positioned at various locations within the transportation network. For example, roadside receivers 608 may be positioned along the side of roads, on signaling devices such as traffic lights, on street signs, on overpasses, on illumination devices, and the like. Each of roadside receivers 608 may include a receiving antenna configured to receive data report signals 114 transmitted by onboard devices 100. In some embodiments, a particular onboard device 100 may compare position data 112 to a list of known positions of roadside receivers 608 to determine whether the particular onboard device 100 is within a threshold distance of one of roadside receivers 608-1 so that onboard device 100-1 may transmit data report signal 114 while onboard device 100 is within the threshold distance. Such embodiments allow onboard devices 100 to operate at lower power levels. In response to receiving data report signals 114 from onboard devices 100, roadside receivers may transmit data report signals 114 to tolling server 602 via WAN 606.

In some embodiments, tolling system 600 may include one or more roadside detectors 610 permanently or semi-permanently positioned at various locations within the transportation network. For example, roadside detectors 610 may be positioned along the side of roads, on signaling devices such as traffic lights, on street signs, on overpasses, on illumination devices, and the like. Each of roadside detectors 610 may include similar components with similar functionality to onboard device 100, such as a controller similar to onboard controller 102 and a capture device (e.g., a camera) similar to capture device 104. Accordingly, roadside detectors 610 may generate data report signals 114 containing vehicle identifiers, vehicle positions, and time stamps. In some embodiments, the data report signals 114 sent by roadside detectors 610 need not include a vehicle position (i.e., a position of each roadside detector 610) as the positions of roadside detectors 610 may already be stored in central data store 604.

Figure 7:
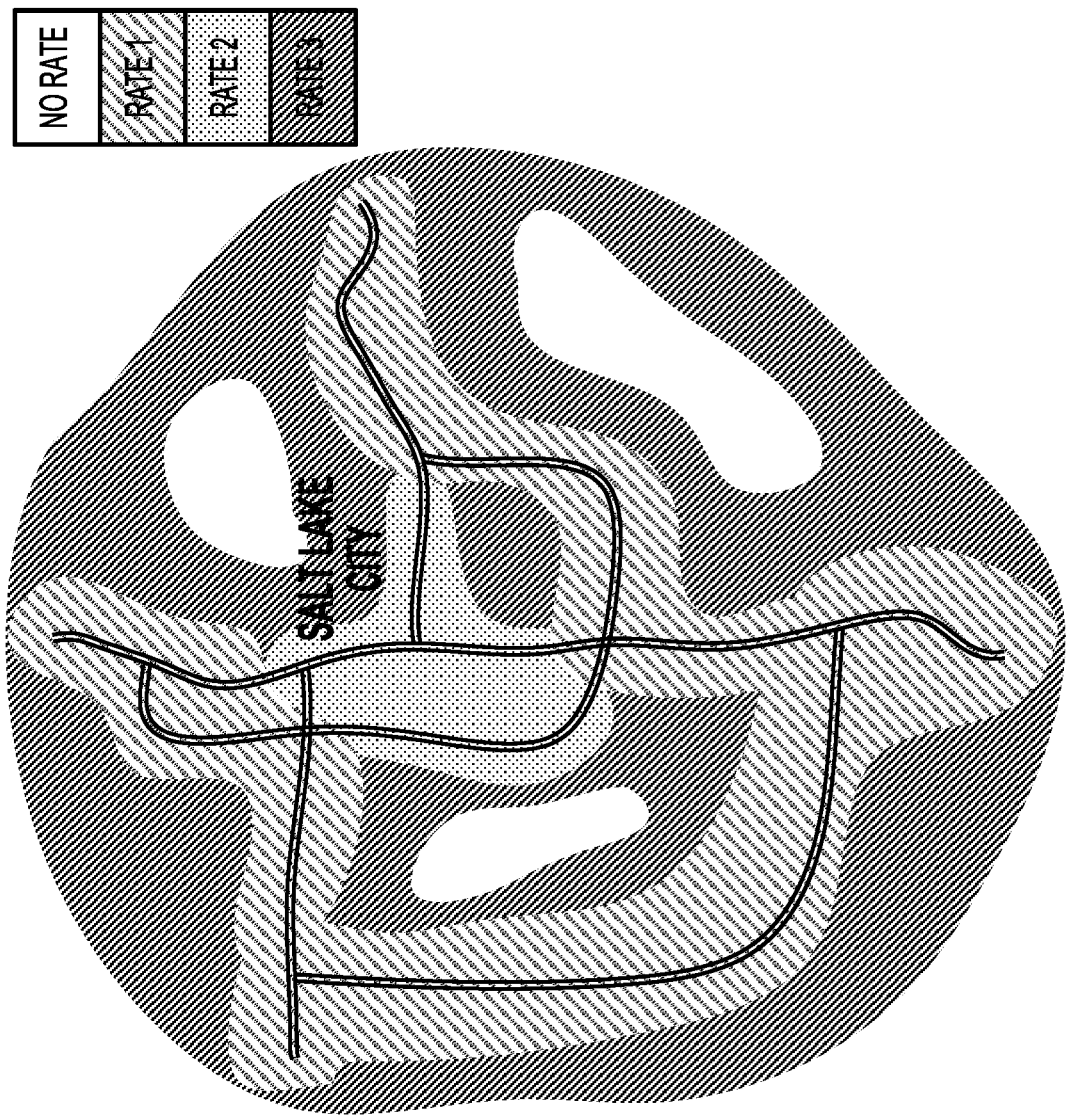
FIG. 7 illustrates a toll map overlaid on a roadway network, according to some embodiments of the present invention.

FIG. 7 illustrates a toll map overlaid on a roadway network, according to some embodiments of the present invention. The roadway network includes highways (shown) and surrounding roads (not shown) on which a vehicle may operate. The toll map indicates different toll rates for operating a vehicle on roads within the transportation network. A vehicle operating within a particular toll rate may be charged based on a per distance rate (e.g., $1 per mile), per time rate (e.g., $1 per minute), or a flat toll (e.g., $1 once operating within a region), among other possibilities. Rates may be set by operators of tolling system 600 to incentivize certain behaviors or to pass on costs associated with maintaining certain roadways onto the users. For example, to incentivize usage of non-highway roadways as opposed to highway roadways, toll rates 1 and 2 may be set higher than toll rate 3. As another example, to pass on the higher costs associated with maintaining highways near a downtown area, toll rate 2 may be set higher than toll rates 1 and 3. Other possibilities are contemplated.

Figure 8:
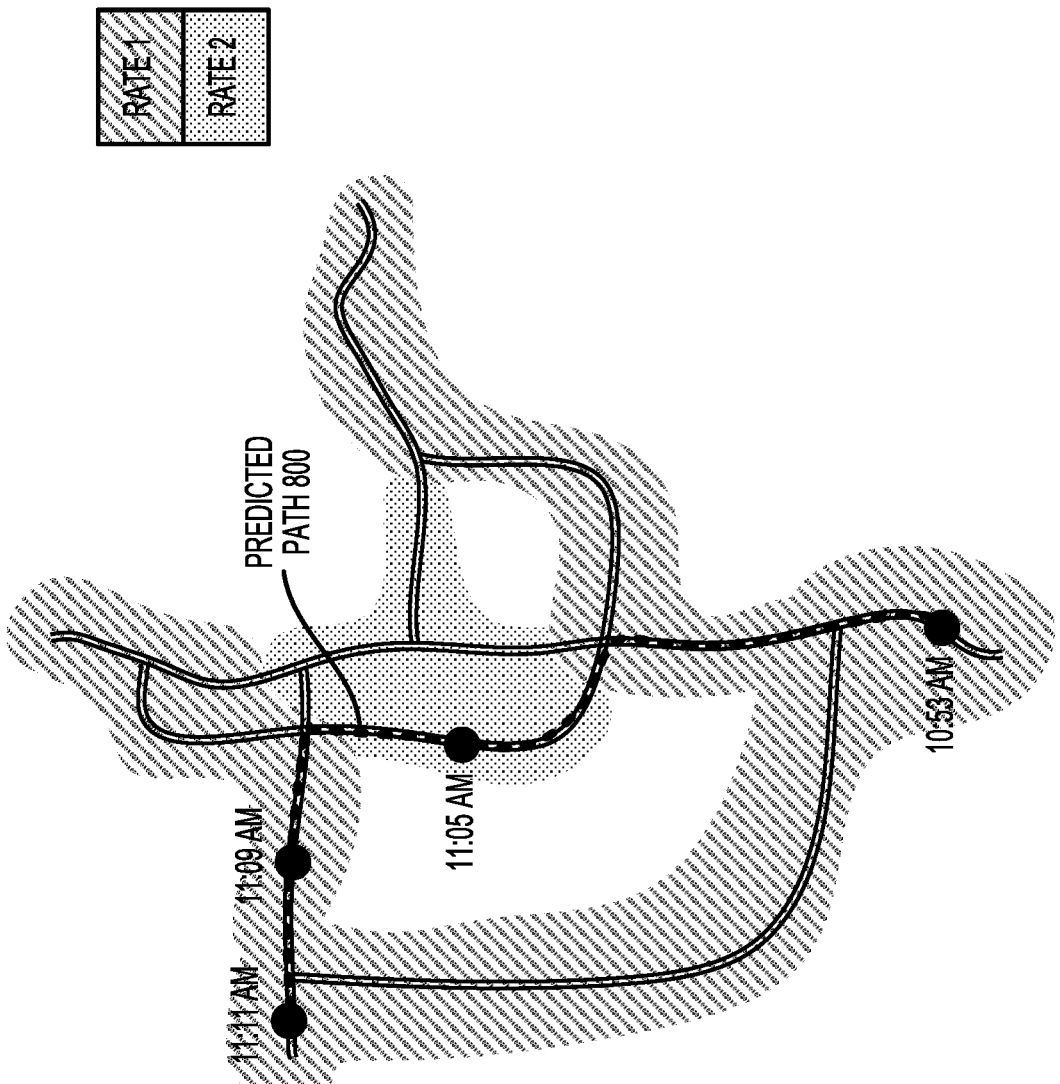
FIG. 8 illustrates a toll map and a predicted path of a vehicle as determined by a tolling server, according to some embodiments of the present invention.

FIG. 8 illustrates a toll map and a predicted path 800 of a vehicle as determined by tolling server 602, according to some embodiments of the present invention. In the illustrated embodiment, tolling server 602 receives four data report signals 114 from other vehicles having onboard devices 100. Each of the four data report signals 114 may contain a vehicle identifier corresponding to the vehicle. The four data report signals 114 may indicate time stamps of "10:53 AM", "11:05 AM", "11:09 AM", and "11:11 AM" at four different positions along highways within the roadway network (positions indicated by filled circles). Tolling server 602 may determine a single predicted path 800 based on the speed limits and distances between the four positions. For example, although different paths may exist that connect each of the four positions, only predicted path 800 is possible given the time constraints imposed by the four time stamps. Tolling server 602 may calculate a toll based on predicted path 800 and toll rates 1 and 2. The vehicle (e.g., the user account associated with the vehicle) may then be charged the calculated toll.

Figure 9:
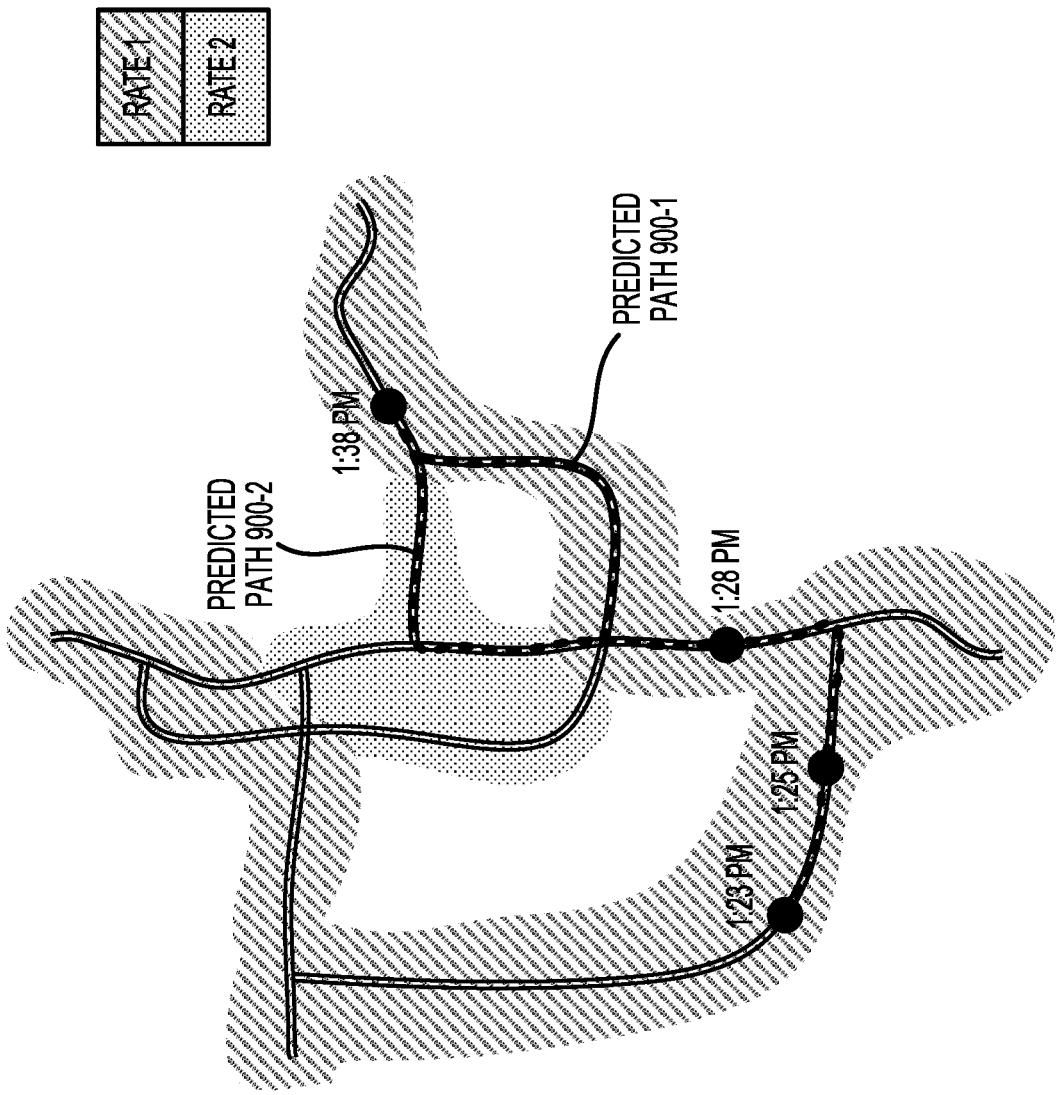
FIG. 9 illustrates a toll map and predicted paths of a vehicle as determined by a tolling server, according to some embodiments of the present invention.

FIG. 9 illustrates a toll map and predicted paths 900 of a vehicle as determined by tolling server 602, according to some embodiments of the present invention. In the illustrated embodiment, tolling server 602 receives four data report signals 114 from other vehicles having onboard devices 100. Each of the four data report signals 114 may contain a vehicle identifier corresponding to the vehicle. The four data report signals 114 may indicate time stamps of "1:23 PM", "1:25 PM", "1:28 PM", and "1:38 PM" at four different positions along highways within the roadway network (positions indicated by filled circles). Tolling server 602 may determine two possible predicted paths 900 based on the speed limits and distances between the four positions. Tolling server 602 may calculate a first toll based on predicted path 900-1 and toll rate 1, and a second toll based on predicted path 900-2 and toll rates 1 and 2. A minimum calculated toll between the first toll and the second toll may be determined, and the vehicle (e.g., the user account associated with the vehicle) may then be charged the minimum calculated toll.

Figure 10:
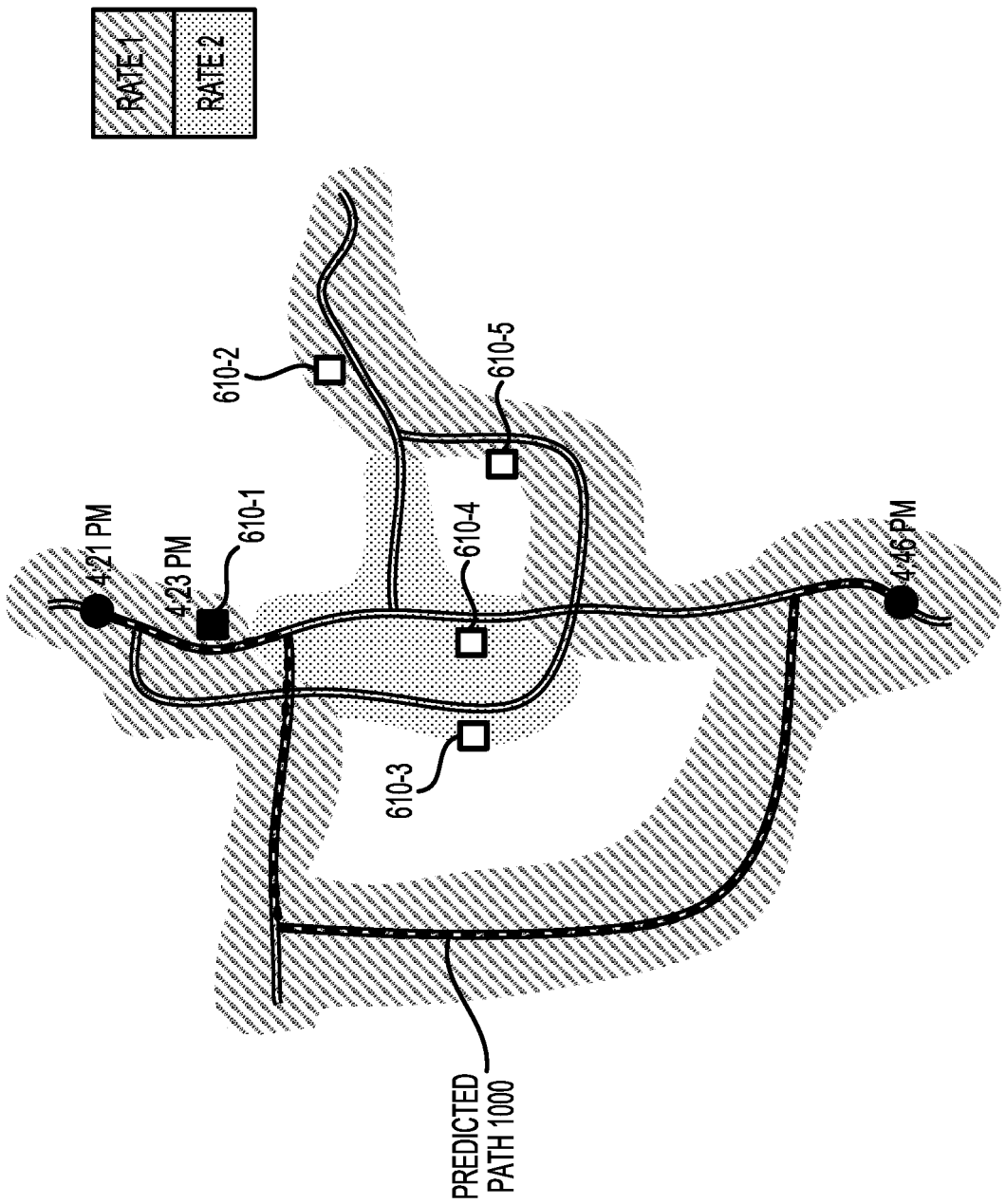
FIG. 10 illustrates a toll map and a predicted path of a vehicle as determined by a tolling server, according to some embodiments of the present invention.

FIG. 10 illustrates a toll map and a predicted path 1000 of a vehicle as determined by tolling server 602, according to some embodiments of the present invention. In the illustrated embodiment, tolling server 602 receives three data report signals 114, including two data report signals 114 from other vehicles having onboard devices 100 and one data report signal 114 from a first roadside detector 610-1. Each of the three data report signals 114 may contain a vehicle identifier corresponding to the vehicle. The three data report signals 114 may indicate time stamps of "4:21 PM", "4:23 PM", and "4:46 PM" at three different positions along highways within the roadway network (positions detected by onboard devices 100 indicated by filled circles and positioned detected by first roadside detector 610-1 indicated by a filled square). Tolling server 602 may determine a single predicted paths 1000 based on the speed limits and distances between the three positions. In some embodiments, additional information is obtained by not receiving data report signals 114 from roadside detectors along possible routes of the vehicle. For example, because tolling server 602 did not receive data report signals 114 from roadside detector 610-3, 610-4, 610-5, any predicted path passing by those roadside detectors may be eliminated. Tolling server 602 may calculate a toll based on predicted path 1000 and toll rates 1 and 2. The vehicle (e.g., the user account associated with the vehicle) may then be charged the calculated toll.

Figure 11:
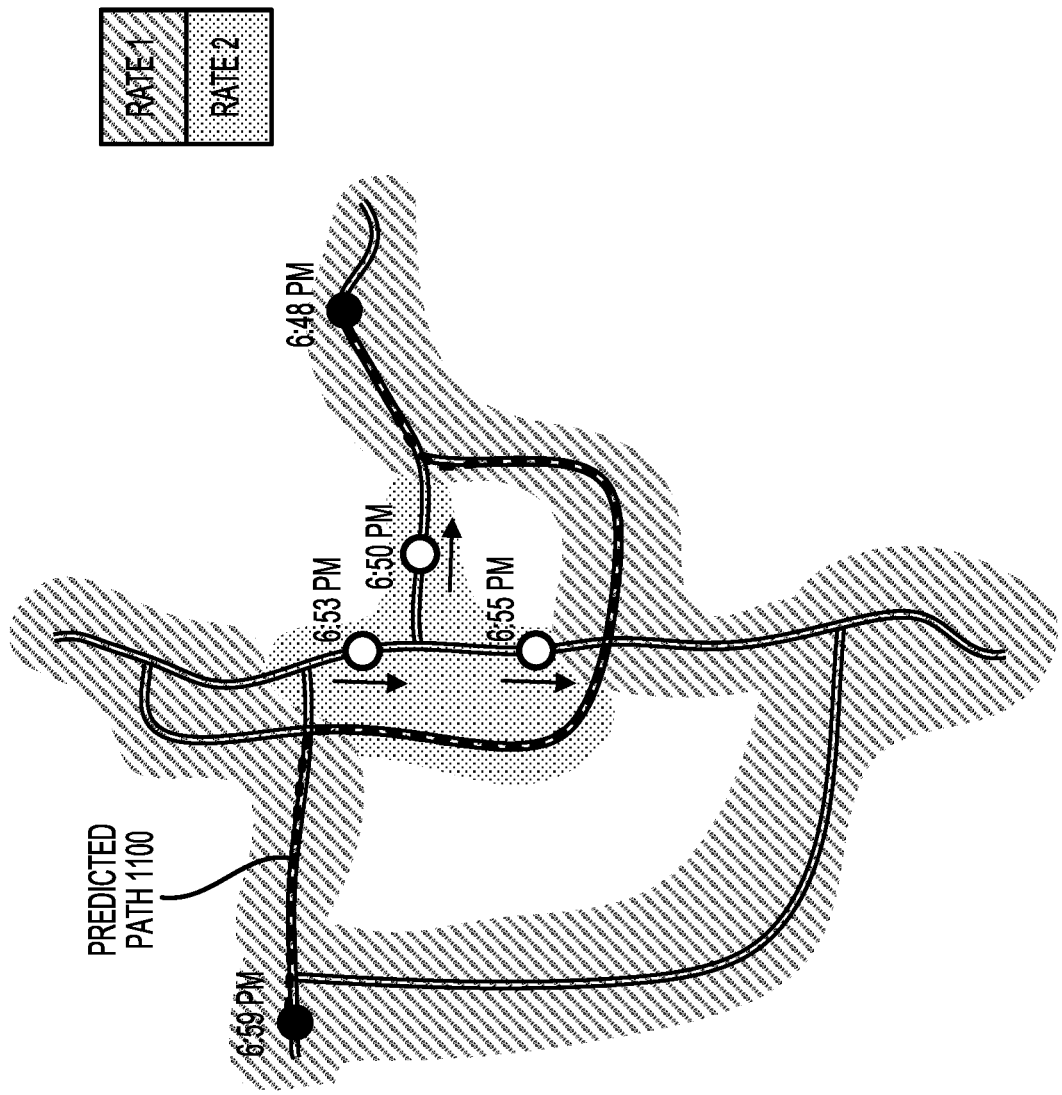
FIG. 11 illustrates a toll map and a predicted path of a vehicle as determined by a tolling server, according to some embodiments of the present invention.

FIG. 11 illustrates a toll map and a predicted path 1100 of a vehicle as determined by tolling server 602, according to some embodiments of the present invention. In the illustrated embodiment, tolling server 602 receives two data report signals 114 from other vehicles having onboard devices 100. Each of the two data report signals 114 may contain a vehicle identifier corresponding to the vehicle. The two data report signals 114 may indicate time stamps of "6:48 PM" and "6:59 PM" at two different positions along highways within the roadway network (positions indicated by filled circles). In some embodiments, additional information is obtained by not receiving data report signals 114 from other vehicles having onboard devices 100 that are operating along possible routes of the vehicle. For example, tolling server 602 may receive three additional data report signals 114 corresponding to a third vehicle and a fourth vehicle from other vehicles having onboard devices 100. The three additional data report signals 114 may indicate time stamps of "6:50 PM", "6:53 PM", and "6:55 PM" at three different positions along highways within the roadway network (positions indicated by unfilled circles). Because tolling server 602 did not receive data report signals 114 corresponding to the vehicle near the positions of the three additional report signals 114, any predicted path passing by those positions may be eliminated. Tolling server 602 may calculate a toll based on predicted path 1100 and toll rates 1 and 2. The vehicle (e.g., the user account associated with the vehicle) may then be charged the calculated toll.

Figure 12:
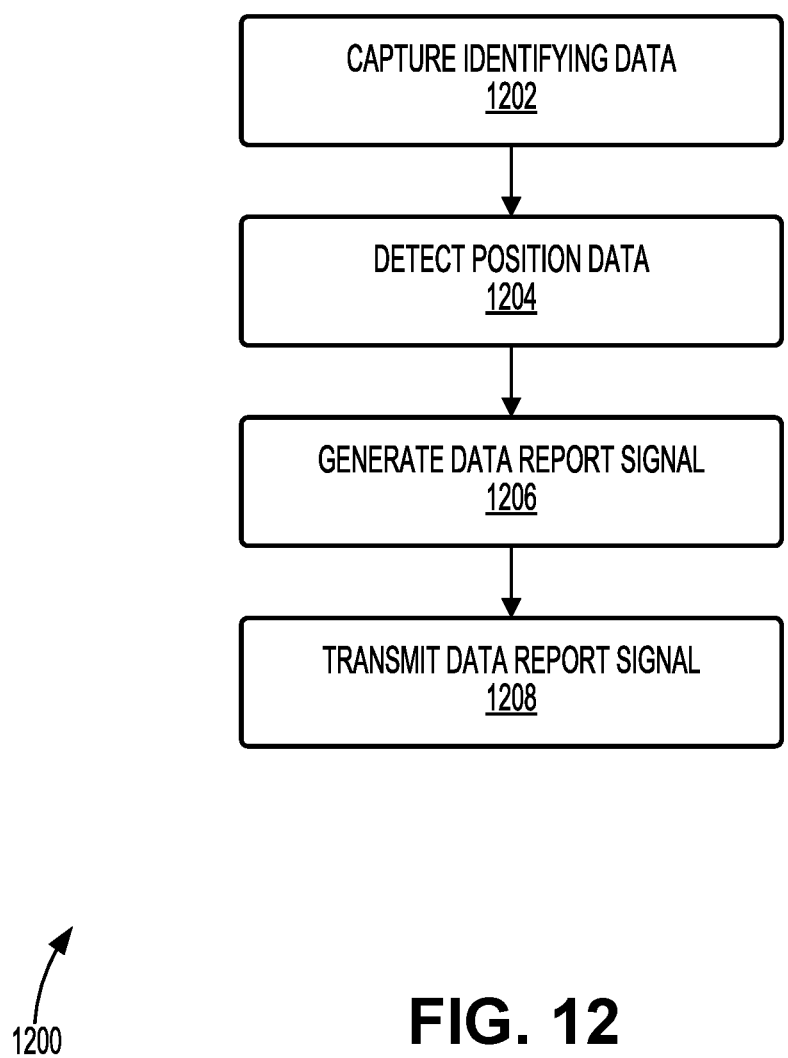
FIG. 12 illustrates a method of generating and transmitting a data report signal, according to some embodiments of the present invention.

FIG. 12 illustrates a method 1200 of generating and transmitting data report signal 114, according to some embodiments of the present invention. One or more steps of method 1200 may be performed by onboard device 100 and components therein such as onboard controller 102, capture device 104, GNSS receiver 106, and transmitter 108. Steps of method 1200 may be performed in an order different than the illustrated embodiment, and one or more steps of method 1200 may be omitted.

At step 1202, identifying data 110 is captured by capture device 104 and is sent from capture device 104 to onboard controller 102. Capture device 104 may be mounted to a first vehicle and identifying data 110 may be associated with a second vehicle. In some embodiments, capture device 104 comprises a camera 116 configured to capture an image of a second vehicle. In such embodiments, identifying data 110 may include the image of the second vehicle.

At step 1204, position data 112 is detected by GNSS receiver 106 and is sent from GNSS receiver 106 to onboard controller 102. GNSS receiver 106 may receive one or more GNSS signals from one or more GNSS satellites and may detect position data 112 based on the GNSS signals. Position data 112 may include a single or a plurality of GNSS points (i.e., position estimates) of the first vehicle. The GNSS points may be used as a proxy for the second vehicle due to the close proximity between the first vehicle and the second vehicle. In some embodiments, the position of the second vehicle may be determined by modifying the GNSS points based on a determined distance between the first vehicle and the second vehicle. For example, an image of the second vehicle (as captured by capture device 104) may be used to determine a distance between the first vehicle and the second vehicle.

At step 1206, data report signal 114 is generated by onboard controller 102 based on identifying data 110 and position data 112. Data report signal 114 may include a vehicle identifier generated based on identifying data 110. The vehicle identifier may correspond to the second vehicle and may include a license plate number, among other possibilities. Data report signal 114 may also include a position generated based on position data 112. The position may correspond to the geospatial location of the first vehicle and, due to the close proximity between the first vehicle and the second vehicle, may also be used to correspond to the geospatial location of the second vehicle.

At step 1208, data report signal 114 is transmitted by transmitter 108 via transmitting antenna 156. In some embodiments, the power of the transmitted data report signal 114 may be increased using power amplifier 154 to compensate for the propagation distance between transmitting antenna 156 and the receiving antenna. For example, at larger distances between transmitting antenna 156 and the receiving antenna, the power of the transmitted data report signal 114 may be increased.

Figure 13:
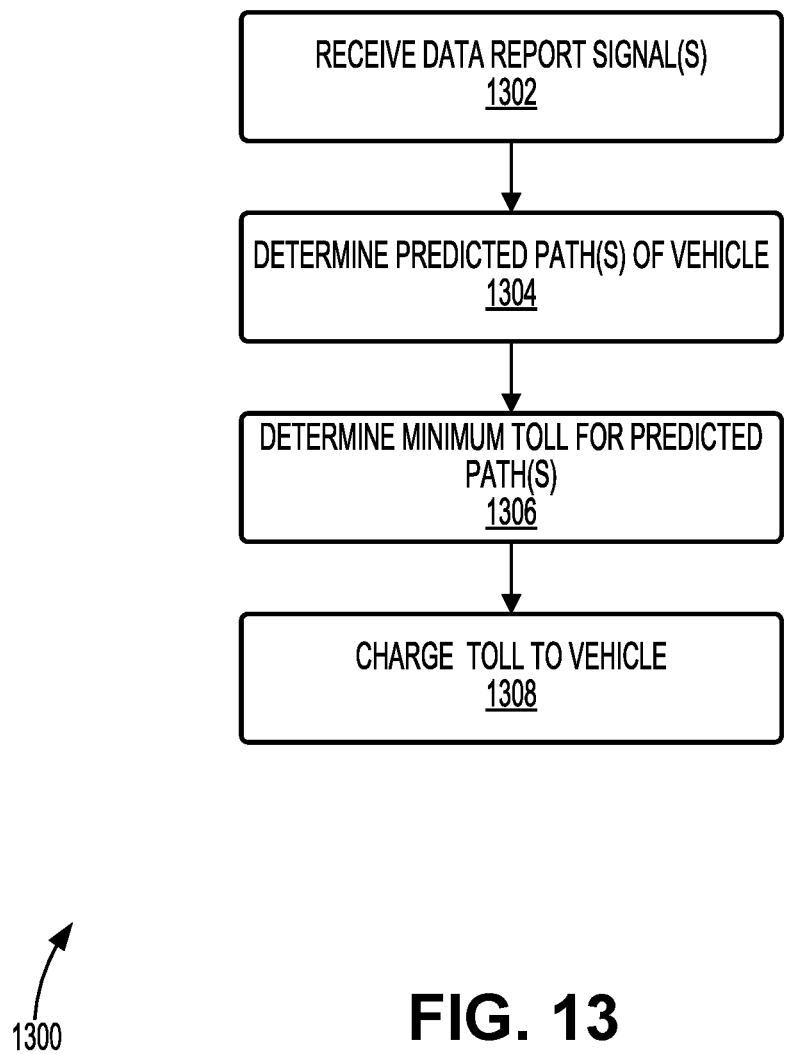
FIG. 13 illustrates a method of calculating a toll, according to some embodiments of the present invention.

FIG. 13 illustrates a method 1300 of calculating a toll, according to some embodiments of the present invention. One or more steps of method 1300 may be performed by tolling server 602. Steps of method 1300 may be performed in an order different than the illustrated embodiment, and one or more steps of method 1300 may be omitted.

At step 1302, tolling server 602 receives one or more data report signals 114. In some embodiments, one or more of the received data report signals 114 are generated and transmitted by onboard devices 100. In some embodiments, one or more of the received data report signals 114 are transmitted by roadside receivers 608 after having been generated by onboard devices 100. In some embodiments, one or more of the received data report signals 114 are generated and transmitted by roadside detectors 610.

At step 1304, tolling server 602 determines one or more predicted paths of the vehicle based on the received data report signals 114. In some embodiments, each of data report signals 114 includes a vehicle identifier corresponding to the vehicle, a position corresponding to the vehicle, and a time stamp associated with the position (i.e., the time at which the position was detected). Tolling server 602 may determine a single or multiple predicted paths based on the speed limits and distances between the positions as constrained by the time stamps. The determination of the predicted paths may further be constrained by current traffic conditions, weather conditions, road closures, the direction of travel, and the like. For example, although different paths may exist that connect each of the positions, only certain path are possible given the constraints imposed by speed limits, driving distances, traffic conditions, etc.

At step 1306, tolling server 602 calculates a toll for each of the one or more predicted paths and determines a minimum toll. In some embodiments, calculating a toll for a predicted path may include accessing a toll map or a toll rate schedule indicating toll rates for operating a vehicle on roads within the transportation network, calculating individual tolls based on the predicted path and the toll rates, and summing the individual tolls. Calculated tolls for each of the one or more predicted paths may be compared to determine a minimum toll.

At step 1308, the toll is charged to the vehicle. In some embodiments, the minimum toll calculated in step 1306 is used as the toll to be charged to the vehicle. In some embodiments, a maximum toll of the calculated tolls for the predicted path is determined and is used as the toll to be charged to the vehicle. In some embodiments, charging the toll to the vehicle includes charging the user account associated with the vehicle.

Figure 14:
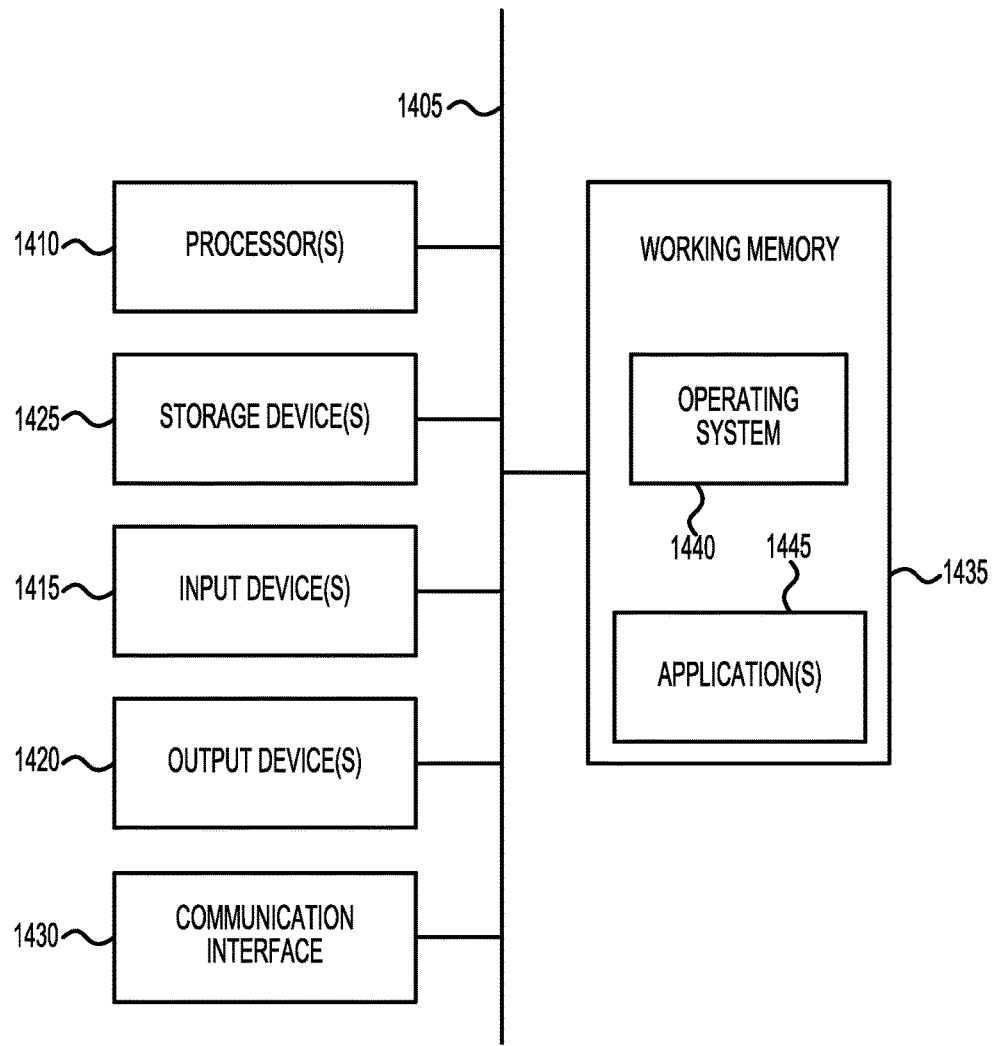
FIG. 14 illustrates a simplified computer system, according to some embodiments of the present invention.

FIG. 14 illustrates a simplified computer system 1400, according to some embodiments of the present invention. Computer system 1400 may be incorporated as part of the previously described computerized devices. For example, computer system 1400 can represent some of the components of onboard device 100, tolling server 602, roadside receiver 608, roadside detector 610, and the like. FIG. 14 provides a schematic illustration of one embodiment of a computer system 1400 that can perform the methods provided by various other embodiments, as described herein. FIG. 14 is meant only to provide a generalized illustration of various components, any or all of which may be utilized as appropriate. FIG. 14, therefore, broadly illustrates how individual system elements may be implemented in a relatively separated or relatively more integrated manner.

The computer system 1400 is shown comprising hardware elements that can be electrically coupled via a bus 1405 (or may otherwise be in communication, as appropriate). The hardware elements may include a processing unit 1410, including without limitation one or more general-purpose processors and/or one or more special-purpose processors (such as digital signal processing chips, graphics acceleration processors, and/or the like); one or more input devices 1415, which can include without limitation a keyboard, a touchscreen, receiver, a motion sensor, a camera, a smartcard reader, a contactless media reader, and/or the like; and one or more output devices 1420, which can include without limitation a display device, a speaker, a printer, a writing module, and/or the like.

The computer system 1400 may further include (and/or be in communication with) one or more non-transitory storage devices 1425, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 1400 might also include a communication interface 1430, which can include without limitation a modem, a network card (wireless or wired), an infrared communication device, a wireless communication device and/or chipset (such as a Bluetooth™ device, an 802.11 device, a Wi-Fi device, a WiMax device, an NFC device, cellular communication facilities, etc.), and/or similar communication interfaces. The communication interface 1430 may permit data to be exchanged with a network (such as the network described below, to name one example), other computer systems, and/or any other devices described herein. In many embodiments, the computer system 1400 will further comprise a non-transitory working memory 1435, which can include a RAM or ROM device, as described above.

The computer system 1400 also can comprise software elements, shown as being currently located within the working memory 1435, including an operating system 1440, device drivers, executable libraries, and/or other code, such as one or more application programs 1445, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such special/specific purpose code and/or instructions can be used to configure and/or adapt a general purpose computer (or other device) to a special purpose computer that is configured to perform one or more operations in accordance with the described methods.

A set of these instructions and/or code might be stored on a computer-readable storage medium, such as the storage device(s) 1425 described above. In some cases, the storage medium might be incorporated within a computer system, such as computer system 1400. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1400 and/or might take the form of source and/or installable code, which, upon compilation and/or installation on the computer system 1400 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 1410, applications 1445, etc.) Further, connection to other computing devices such as network input/output devices may be employed.

Some embodiments may employ a computer system (such as the computer system 1400) to perform methods in accordance with the disclosure. For example, some or all of the procedures of the described methods may be performed by the computer system 1400 in response to processing unit 1410 executing one or more sequences of one or more instructions (which might be incorporated into the operating system 1440 and/or other code, such as an application program 1445) contained in the working memory 1435. Such instructions may be read into the working memory 1435 from another computer-readable medium, such as one or more of the storage device(s) 1425. Merely by way of example, execution of the sequences of instructions contained in the working memory 1435 might cause the processing unit 1410 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1400, various computer-readable media might be involved in providing instructions/code to processing unit 1410 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1425. Volatile media include, without limitation, dynamic memory, such as the working memory 1435. Transmission media include, without limitation, coaxial cables, copper wire and fiber optics, including the wires that comprise the bus 1405, as well as the various components of the communication interface 1430 (and/or the media by which the communication interface 1430 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 1430 (and/or components thereof) generally will receive the signals, and the bus 1405 then might carry the signals (and/or the data, instructions, etc. carried by the signals) to the working memory 1435, from which the processor(s) 1405 retrieves and executes the instructions. The instructions received by the working memory 1435 may optionally be stored on a non-transitory storage device 1425 either before or after execution by the processing unit 1410.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

What is claimed is:

1. An onboard device for mounting to or integrating with a first vehicle, the onboard device comprising:
   a capture device configured to capture identifying data associated with a second vehicle;
   a Global Navigation Satellite System (GNSS) receiver configured to detect position data;
   an onboard controller communicatively coupled to the capture device and the GNSS receiver, wherein the onboard controller is configured to perform operations including:
      receiving the identifying data from the capture device;
      receiving the position data from the GNSS receiver; and
      generating a data report signal based on the identifying data and the position data; and
   a transmitting antenna configured to transmit the data report signal to a tolling server for identifying, by the tolling server, a vehicle identifier corresponding to the second vehicle based on the identifying data and calculating a toll for the second vehicle based on the data report signal transmitted by the first vehicle.

2. The onboard device of claim 1, wherein the capture device comprises a camera and the identifying data comprises an image of the second vehicle.

3. The onboard device of claim 1, wherein the data report signal includes:
   the vehicle identifier generated based on the identifying data; and
   a position generated based on the position data.

4. The onboard device of claim 3, wherein the data report signal further includes a time stamp associated with the position and the vehicle identifier.

5. The onboard device of claim 1, wherein the capture device and the GNSS receiver are communicatively coupled to the onboard controller via wired connections.

6. The onboard device of claim 1, wherein the capture device is communicatively coupled to the onboard controller via a wireless connection.

7. The onboard device of claim 1, wherein the GNSS receiver is communicatively coupled to the onboard controller via a wireless connection.

8. A method comprising:
   capturing, using a capture device mounted to or integrated with a first vehicle, identifying data associated with a second vehicle;
   detecting, using a Global Navigation Satellite System (GNSS) receiver mounted to or integrated with the first vehicle, position data;
   receiving, by an onboard controller mounted to or integrated with the first vehicle, the identifying data from the capture device;
   receiving, by the onboard controller, the position data from the GNSS receiver;
   generating, by the onboard controller, a data report signal based on the identifying data and the position data; and
   transmitting, via a transmitting antenna communicatively coupled to the onboard controller, the data report signal to a tolling server for identifying, by the tolling server, a vehicle identifier corresponding to the second vehicle based on the identifying data and calculating a toll for the second vehicle based on the data report signal transmitted by the first vehicle.

9. The method of claim 8, wherein the capture device comprises a camera and the identifying data comprises an image of the second vehicle.

10. The method of claim 8, wherein the data report signal includes:
    the vehicle identifier generated based on the identifying data; and
    a position generated based on the position data.

11. The method of claim 10, wherein the data report signal further includes a time stamp associated with the position and the vehicle identifier.

12. The method of claim 8, wherein the capture device and the GNSS receiver are communicatively coupled to the onboard controller via wired connections.

13. The method of claim 8, wherein the capture device is communicatively coupled to the onboard controller via a wireless connection.

14. The method of claim 8, wherein the GNSS receiver is communicatively coupled to the onboard controller via a wireless connection.

15. A vehicle comprising:
    a capture device configured to capture identifying data associated with a second vehicle;
    a Global Navigation Satellite System (GNSS) receiver configured to detect position data;
    an onboard controller communicatively coupled to the capture device and the GNSS receiver, wherein the onboard controller is configured to perform operations including:
       receiving the identifying data from the capture device;
       receiving the position data from the GNSS receiver; and
       generating a data report signal based on the identifying data and the position data; and
    a transmitting antenna configured to transmit the data report signal to a tolling server for identifying, by the tolling server, a vehicle identifier corresponding to the second vehicle based on the identifying data and calculating to calculate a toll for the second vehicle based on the data report signal transmitted by the vehicle.

16. The vehicle of claim 15, wherein the capture device comprises a camera and the identifying data comprises an image of the second vehicle.

17. The vehicle of claim 15, wherein the data report signal includes:
    the vehicle identifier generated based on the identifying data; and
    a position generated based on the position data.

18. The vehicle of claim 17, wherein the data report signal further includes a time stamp associated with the position and the vehicle identifier.

19. The vehicle of claim 15, wherein the capture device and the GNSS receiver are communicatively coupled to the onboard controller via wired connections.

20. The vehicle of claim 15, wherein the capture device is communicatively coupled to the onboard controller via a wireless connection.

* * * * *